United States Patent [19]

Okamoto et al.

[11] Patent Number: 4,871,934
[45] Date of Patent: Oct. 3, 1989

[54] INDUCTION MOTOR

[75] Inventors: Kiyokazu Okamoto; Tetsuo Endo; Yukio Miyamoto; Yoshiharu Suzuki, all of Toyko, Japan

[73] Assignee: NEC Corporation, Japan

[21] Appl. No.: 35,622

[22] Filed: Apr. 3, 1987

[30] Foreign Application Priority Data

Apr. 4, 1986 [JP] Japan .................................. 61-77839

[51] Int. Cl.$^4$ ........................................... H02K 17/00
[52] U.S. Cl. .................................... 310/166; 310/184; 310/198; 310/211; 310/254; 310/261
[58] Field of Search ................. 310/166, 51, 211, 212, 310/184, 261, 264, 265, 254, 258, 259, 198

[56] References Cited

U.S. PATENT DOCUMENTS

| | | | |
|---|---|---|---|
| 606,912 | 7/1898 | Blathy et al. | 310/51 X |
| 3,013,168 | 12/1961 | Ellis | 310/166 |
| 3,671,789 | 6/1972 | Menzies | 310/212 X |
| 4,263,526 | 4/1981 | Taguchi | 310/51 X |
| 4,371,802 | 2/1983 | Morrill | 310/166 |

Primary Examiner—R. Skudy
Attorney, Agent, or Firm—Ostrolenk, Faber, Gerb & Soffen

[57] ABSTRACT

Stator slots are skewed relative to rotor slots with a skew amount comprising an integer multiple of a stator electrical angle of 60°, thereby minimizing a torque ripple which is an integer multiple of six times of a primary frequency of electrical energy.

6 Claims, 7 Drawing Sheets

INDUCTION MOTOR

BACKGROUND OF THE INVENTION

The present invention relates to an induction motor and, more particularly, to a highly precise variable speed servo induction motor operable in a wide speed range.

Conventional induction motors have been used as low-cost, roughly constant-speed motors. Along with recent developments of drive control techniques supported by developments in electronic devices and in software, induction motors have been used as highly precise variable speed servo motors. Servo motors must be smoothly operated in a low-speed range including zero speed. For this purpose, desired torque must be generated. Fidelity of desired torque generation is represented by the fact that a generated torque TG is substantially equal to a constant (without variations) load torque TL; that is, a torque ripple ΔT (i.e., harmonic torque) comes to minimum for TG=TL+ΔT when the induction motor is operated to generate the load torque TL.

The performance of the induction motor from the viewpoint of an object to be driven is determined by the induction motor itself and a variable frequency power source (to be referred to as a driver hereinafter) for applying electrical energy to the induction motor. The frequency of the variable frequency power source is called a primary frequency since the energy is applied to the primary winding of the induction motor. This frequency is represented by f1. Most of the conventional drivers generate simple 3-phase rectangular wave voltages. According to the influences of a magnetomotive force caused by space and time harmonic components, since the voltage waveform includes time harmonic components which are (6k±1) (k=1, 2, 3, ...) times the primary frequency f1, a torque ripple component having a frequency of 6kf1 appears in a "force wave" proportional to the output torque TG of the induction motor. In other words, such a torque ripple is regarded as caused by the driver. Recent drivers have been improved due to developments of electronic devices (e.g., LSIs and power-controlled semiconductors); current, speed and position detectors; and software techniques for achieving highly precise, high-speed data processing. A electric current having substantially a sinusoidal wave can be supplied from the driver to a induction motor in the wide, variable frequency range.

However, when the induction motor serves as a servo motor driven at a very low speed below the frequency f1 (typically below several Hz), the torque ripple of the 6kf1 harmonic component is not generated by the driver but by the induction motor. Therefore, it is indispensable to eliminate the torque ripple generated by the induction motor itself.

SUMMARY OF THE INVENTION

It is an object of the present invention to provide an inexpensive, rigid induction motor which eliminates a torque ripple therefrom and can serve as a highly precise, variable speed servo motor driven in a wide variable speed range.

In order to achieve the above object of the present invention, there is provided an induction motor including a stator having slots for accommodating a primary winding therein, the stator being adapted to generate a rotary magnetic flux upon application of electrical energy to the primary winding, and a rotor or a moving element having slots for accommodating a secondary winding consisting of coils or a squirrel-cage circuit (not shown in the drawings), the induction motor being adapted to cause the rotor to generate a torque or a thrust by a magnetic flux crossing the secondary winding and a secondary current flowing due to electromagnetic induction in the stator is inserted when the electrical energy is applied to the induction motor to cause electromagnetic induction in the stator and to supply the secondary current to the secondary winding, wherein the stator slots are skewed relative to the rotor slots and a skew amount is an integer multiple of a stator electrical angle of 60°, thereby cancelling a torque ripple which is an integer multiple of six times of the primary frequency of the electrical energy.

BRIEF DESCRIPTION OF THE DRAWINGS

The present invention will be described in detail with reference to a preferred embodiment in conjunction with the accompanying drawings.

Before the preferred embodiment is described, the principle of the present invention will be clarified below. The following analysis itself is new and novel.

Figure 1A:
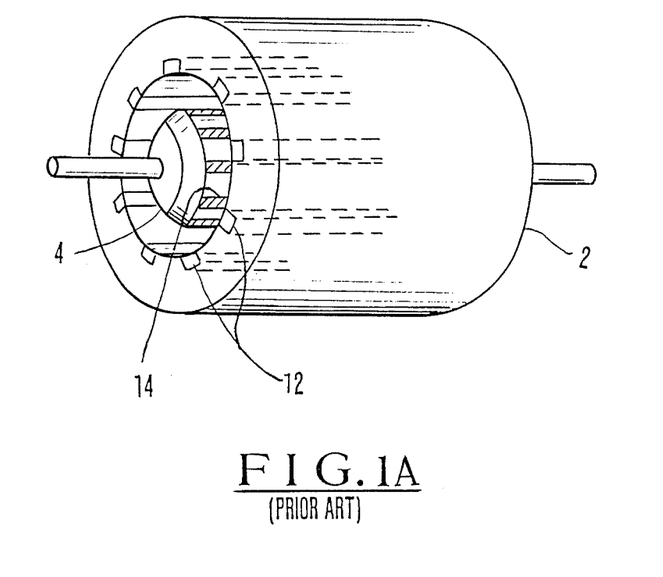
FIG. 1A is a schematic view for explaining a basic arrangement of an induction motor.
Figure 1B:
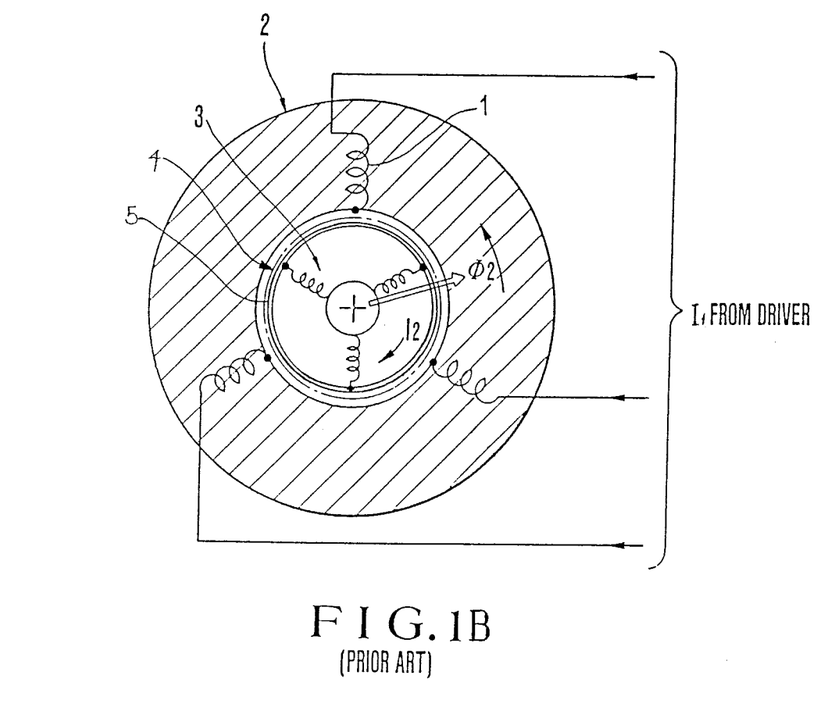
FIG. 1B is a schematic view for explaining relation between electric current and magnetic flux in the induction motor.
Figure 1C:
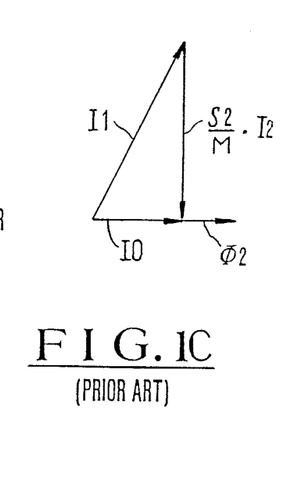
FIG. 1C is a vector diagram showing relations between current vectors.

(1) Basic Characteristics of Induction Motor and Characteristics of Generated Torque FIGS. 1A, 1B and 1C are a sectional views showing the principle of a general induction motor. Referring to FIGS. 1A and 1B, the induction motor comprises a stator 2 having slots 12 for accommodating a primary winding 1 therein and a rotor 4 having slots 14 for accommodating a secondary winding 3. A primary current supplied to the primary winding is represented by T1 (vector). In particular, when the induction motor is operated without any load, i.e., the induction motor is operated to generate zero torque, the primary current consists of an excitation current I0 (vector). A secondary current induced in the secondary winding 3 is represented by I2 (vector).

When the primary current is applied to the primary winding 1, a rotary magnetic flux $\Phi 2$ (vector) is generated in a gap 5 between the stator 2 and the rotor 4. FIG. 1C shows relations between vectors of the excitation current I0, the primary current I1, the secondary current I2, and the magnetic flux $\phi 2$.

The secondary current I2 is induced in the secondary winding 3 according to the magnetic flux $\phi 2$. An effect of the secondary current on the primary winding 1 is proportional to a self inductance S2 of the secondary winding 3 and a reciprocal of a mutual inductance M between the primary winding 1 and the secondary winding 3. According to well known vector control system originated by K. Hasse (West German) in 1969, vector control is performed so as to maintain the excitation current vector I0 and the secondary current vector I2 to be perpendicular to each other. Thus, the instantaneous torque TG is represented by equation (4) as described later.

The rotary magnetic flux $\Phi 2$ crosses the secondary winding 3. If a relative speed is present between the rotary magnetic flux $\Phi 2$ and the secondary winding 3, that is, a difference between the rotational speed of $\Phi 2$ and the rotational speed of the rotor is present (this difference is represented by a slip speed Ws or a slip frequency fs, i.e., Ws=2$\pi$fs), the secondary current I2 is induced in the secondary winding 3. The rotary magnetic flux and the secondary current I2 cause the rotor 4 to generate the torque TG in the same principle as in an Arago disk. The causes of the torque ripple $\Delta$T included in the torque TG are an unbalance of the power source, a circuitry unbalance of the primary winding 1 of the induction motor, and a circuitry unbalance of the secondary winding 3 of the induction motor. Among these causes, the unbalance of the power source can be eliminated by improving the driver. The unbalances of the primary and secondary windings can be eliminated by using the induction motor within the limits of its ratings.

According to another analysis, the frequency of electrical vibrations and electromagnetic noise of the induction motor is twice the frequency (fundamental wave) f1 of the primary current I1 or twice the slip frequency fs.

When a 3-phase induction motor is driven by a driver having a rectangular wave output including many harmonic components, the torque ripple $\Delta$T can be analyzed such that the frequencies of the harmonic torque $\Delta$T are 6 times, 12 times, 18 times, etc. the frequency f1 of the primary current I1. When a sinusoidal PWM (Pulse Width Modulation) output is used in the driver, a sinusoidal wave can be obtained wherein the waveform of the primary current I1 is greatly improved. Therefore, the above-mentioned steady torque ripple $\Delta$T can be eliminated according to this analysis.

In the wide range of frequencies f1, when the induction motor is driven by using the primary current I1 having an almost ideal sinusoidal wave, the harmonic component of 2f1 or the like appears as the major factor of the torque ripple $\Delta$T when the motor speed is relatively high. However, when the motor speed is gradually reduced, the harmonic components such as 2f1 are not conspicuous. However, in this case, harmonic components such as 6f1 and 12f1 become conspicuous. This phenomenon occurs when the primary current I1 has not only a rectangular waveform but also a sinusoidal waveform. No clear explanation is given for the cause of generation of the 6f1, 12f1, etc. torque ripple components $\Delta$T in the primary current I1 when the sinusoidal wave is output. Therefore, no countermeasures are provided to eliminate these torque ripple components. However, in the highly precise servo motor, the 6f1, 12f1, etc. torque ripple components $\Delta$T at substantially zero speed are decisive.

(2) Quantitative Expression of Induction Motor Torque TG

The instantaneous torque TG of the induction motor can be expressed by the following equation:

$$TG = -j\Phi 2.I2 \tag{1}$$

The excitation current I0 and the primary winding conversion coefficient are used to derive the following equations:

$$\Phi 2 = M.I0 \tag{2}$$

$$I2 = -(M/R2).(d/dt + jWs)I0 \tag{3}$$

where M is the mutual inductance between the primary and secondary windings of the induction motor, R2 is the resistance of the secondary winding, and j is an operator representing an orthogonal relationship. R2 and M may be regarded as constants although they depend on temperature changes.

As is apparent from equations (2) and (3), if the excitation current I0 has a sinusoidal wave, the magnetic flux $\Phi 2$ and the secondary current I2 have sinusoidal waves accordingly. Even if the current I1 has a sinusoidal wave and the current I0 has also a sinusoidal wave, actually many space harmonic components are included in the magnetic flux $\Phi 2$ and the secondary current I2. In other words, equations (2) and (3) are ideal, and the current I0 includes many space harmonic components (waves of (6k+1) times of f1 or (6l+5) times of f1, where k and l=0, 1, 2, ...). The excitation current I0 including these harmonic components is represented by $\bar{I0}$. Similarly, the magnetic flux $\Phi 2$ and the secondary current I2, both of which include harmonic components, are represented by $\bar{\Phi 2}$ and $\bar{I2}$, respectively. The torque TG is given as follows even if the excitation current I0 is a sinusoidal wave current:

$$TG = -j\bar{\Phi 2}.\bar{I2}$$

$$= (jM\bar{I0}).(M/R2).(d/dt + jWs).\bar{I0}$$

In the steady state, $(j\bar{I0}).(d/dt.\bar{I0}) = 0$ is assumed, therefore $$TG = -(M^2/R2)Ws(\bar{I0}.\bar{I0}) \tag{4}$$

(3) New Expression of TG Torque Spectrum

Even if the sinusoidal primary current I1 held in an equilibrium state is supplied from the driver to the primary winding 1 in the induction motor then due to the limitations of the electromagnetic structure of the stator 2, the primary current $\bar{I1}$ and the excitation current $\bar{I0}$ which include space harmonic components must be taken into consideration due to the following reason.

As is well known, the primary winding 1 comprises a limited number of coils, and its spatial disposition is represented by a simple concentrated winding including many harmonic components, or a distributed winding including a small number of harmonic components, or a distributed fractional-pitch winding. Even if a current supplied to the coils has a sinusoidal wave including a small number of harmonic components, electromotive force components (a total of these components is proportional to the magnetic flux $\overline{\Phi 2}$, excluding the variations caused by the stator slots) generated by the respective coils have rectangular waveform at locations where the coils are present. The magnetic flux $\overline{\Phi 2}$ is regarded to include the space harmonic components corresponding to the rectangular waveform. Therefore, the excitation current $\overline{I0}$ corresponding to the magnetic flux $\overline{\Phi 2}$ include the space harmonic components accordingly.

The quantitative expression of the excitation current I0 will be made. Assume that the induction motor is a 3-phase motor. Three identical coils A, B, and C arranged to be spatially (i.e., electrical angle) 120° out of phase constitute the primary winding 1. The excitation currents supplied to the coils A, B, and C are defined as $\overline{ioa}$, $\overline{iob}$, and $\overline{ioc}$, respectively. These excitation currents include harmonic components Tp (p≧1) corresponding to the time harmonic components and are represented as follows.

$$\overline{ioa} = (\sqrt{2}/2) \sum_p \sqrt{3} Tp\{e^{jp\omega t} + e^{-jp\omega t}\} \quad (5)$$

$$\overline{iob} = (\sqrt{2}/2) \sum_p \sqrt{3} Tp\{e^{jp(\omega t - 2\pi/3)} + e^{-jp(\omega t - 2\pi/3)}\} \quad (6)$$

$$\overline{ioc} = (\sqrt{2}/2) \sum_p \sqrt{3} Tp\{e^{jp(\omega t - 4\pi/3)} + e^{-jp(\omega t - 4\pi/3)}\} \quad (7)$$

where ω is the angular frequency corresponding to the primary frequency.

The excitation current $\overline{I0}$ further includes the space harmonic components Sn (n≧1) and is defined as follows:

$$\overline{I0} = \sqrt{2/3} \{\overline{ioa} \cdot \Sigma Sn(e^{jn\theta} + e^{-jn\theta}) + \overline{iob} \cdot \Sigma Sn(e^{jn(\theta - 2\pi/3)} + e^{-jn(\theta - 2\pi/3)}) + \overline{ioc} \cdot \Sigma Sn(e^{jn(\theta - 4\pi/3)} + e^{-jn(\theta - 4\pi/3)})\} \quad (8)$$

Since the 3-phase induction motor is manufactured to be electromagnetically balanced, the harmonic components of even-numbered orders and the harmonic components of orders which are integer multiples of three times the fundamental wave are eliminated. Therefore, $$p = 6k+1, 6k+5 \ (k=0, 1, 2, \ldots)$$

$$n = 6l+1, 6l+5 \ (l=0, 1, 2, \ldots) \text{ tm } (9)$$

The following relations are also established:

$$1 + e^{\pm j(p+n)2\pi/3} + e^{\pm j(p+n)4\pi/3} =$$

$$\begin{cases} 0 \ldots \text{ for } p + n \neq \text{ a multiple of 3} \\ 3 \ldots \text{ for } p + n = \text{ a multiple of 3} \end{cases} \quad (10)$$

$$1 + e^{\pm j(p-n)2\pi/3} + e^{\pm j(p-n)4\pi/3} =$$

$$\begin{cases} 0 \ldots \text{ for } p - n \neq \text{ a multiple of 3} \\ 3 \ldots \text{ for } p - n = \text{ a multiple of 3} \end{cases} \quad (11)$$

Substitutions of equations (5), (6), and (7) into equation (8) using relations (10) and (11) yield the following:

$$\overline{I0}/6 = \sum_{\substack{p=6k+1 \\ n=6l+5}} SnTp\cos(p\omega t + n\theta) + \sum_{\substack{p=6k+5 \\ n=6l+5}} SnTp\cos(p\omega t + n\theta) + \sum_{\substack{p=6k+1 \\ n=6l+1}} SnTp\cos(p\omega t - n\theta) + \sum_{\substack{p=6k+5 \\ n=6l+5}} SnTp\cos(p\omega t - n\theta) \quad (12)$$

Equation (12) derives $\overline{I0} \cdot \overline{I0}$ in equation (4) in the following manner:

$$\overline{I0} \cdot \overline{I0}/36 = \Sigma SnTpSn'Tp' \{\cos[(p + p')\omega t + (n + n')\theta] + \cos[(p - p')\omega t + (n - n')\theta]\} + \Sigma SmTqSn'Tp'\{\cos[(q + p')\omega t - (m - n')\theta] + \cos[(q - p')\omega t - (m + n')\theta]\} + \Sigma SnTpSm'Tq' \{\cos[(p + q')\omega t + (n - m')\theta] + \cos[(p - q')\omega t + (n + m')\theta]\} + \Sigma SmTgSm'Tg'\{\cos[(q + q')\omega t - (m + m')\theta] + \cos[(q - q')\omega t - (m - m')\theta]\} \quad (13)$$

for n, n', m, and m' each takes one of 6l+1 and 6l+5 (=0, 1, 2, ...); and p, p', q, and q' each takes one of 6k+1 and 6k+5 (k=0, 1, 2, ...).

The first one of the four terms of the sum in equation (13) is exemplified to explain the orders of harmonic components.

As for cos [(p+p')ωt+(n+n')θ], the following relations are established:

$$p+p'=6(k+k'+1)$$

$$n+n'=6(l+l'+1) \quad (14)$$

among the combinations of:

n=6l+1 and p=6k+5, n=6l+5 and p=6k+1, n'=6l'+5 and p'=6k'+1, and n'=6l'+1 and p'=6k'+5 and as for cos $[(p-p')t+(n-n')\theta]$ $p-p'=6(k-k')$ $n-n'=6(l-l')$ (15)

among the combinations of:

$n=6l+1$ and $p=6k+1$, $n=6l+5$ and $p=6k+5$, $n'=6l'+1$ and $p'=6k'+1$, and $n'=6l'+5$ and $p'=6k'+5$.

The 6th harmonic components are confirmed for $\omega t$ and $\theta$.

Other combinations for the first term include the 6th±2nd harmonic components. The 6th harmonic components for $\omega t$ and $\theta$ can be checked for the second, third and fourth terms in equation (13). Further, 6th±2nd harmonic components are included in the second, third, and fourth terms in the same manner as in the first term. However, if the order is low and the number of components is large, major components are 6th harmonic components shown in equations (14) and (15). Equations (14) and (15) represent:

6th order $\omega t$ . . . time harmonic components

6th order $\theta$ . . . space harmonic components.

Even if the primary current I1 is a sinusoidal wave current, i.e., the current I1 does not contain the time harmonic components, the magnetic flux $\bar{\Phi}2$ and the secondary current $\bar{I}2$ which include the 6th space harmonic components corresponding to Tp or Tq excluding T1 in equation (13) or to zero in equation (13) must be taken into consideration. If the primary current $\bar{I}1$ include the time harmonic components, the 6th time harmonic components must be considered in the same manner as in the conventional case. The value of coefficient Sn in equation (13) is determined by the primary winding and is decreased in an order of a concentrated winding, a distributed winding, and a distributed fractional-pitch winding. However, since the limited number of coils of the primary winding are fitted in the corresponding number of slots, the improvement is limited.

The Tp value is determined by the harmonic component of the primary current I1 and can be greatly decreased by an improvement of the primary current I1. However, in order to reduce the influence of the space harmonic components to reduce the torque ripple components $\Delta T$, the induction motor itself must be improved. As is apparent from the above analysis, it should be noted that a countermeasure for reducing the 6th space harmonic components can also serve as the one for reducing the 6th time harmonic components.

In general, measurements prove that harmonic components of lower orders often have larger spectra because the Sn and Tp values are large when the n and p values are small (i.e., the orders are lower).

(4) Novel Electromagnetic Structure of IM for Minimizing $\Delta T$

For the sake of simplicity, it is assumed that the torque TG is generated on the surface (i.e., gap cylindrical surface) of the rotor.

If the harmonic components of the torque $\Delta T$ are 6qf1 (q=an integer) components, the following torque ripples are generated across the rotor in the range of 360° of the stator opposing the gap cylindrical surface of the rotor:

6-peak torque ripple having a change width T6 for q=1;

12-peak torque ripple having a change width T12 for q=2; and 18-peak torque ripple having a change width T18 for q=3.

Figure 2:
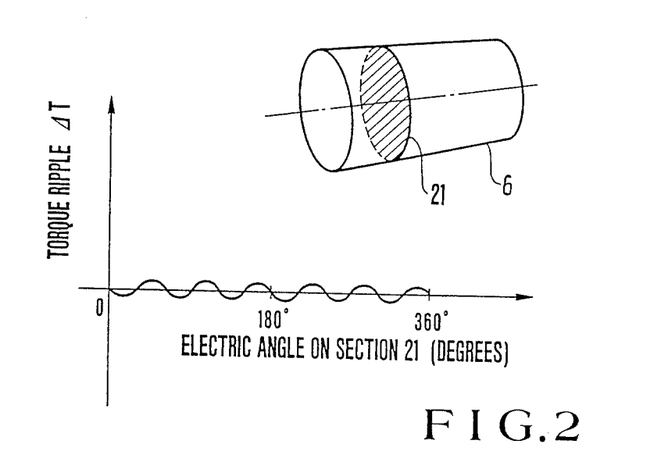
FIGS. 2 and 3 are views for explaining the principle of the present invention.
Figure 3:
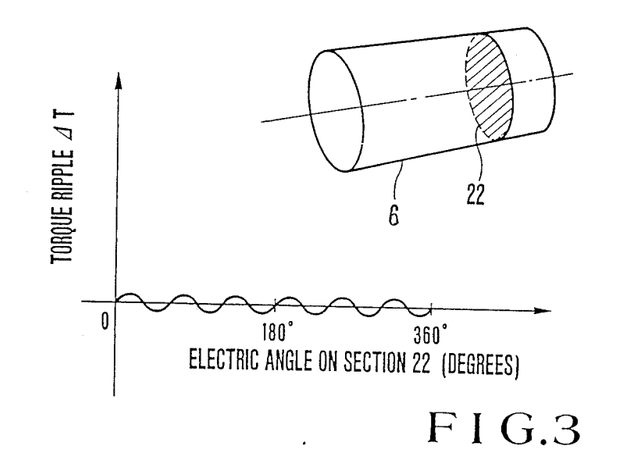

FIG. 2 shows the case for q=1, explaining the relationship between the electrical angle and the torque ripple $\Delta T$ on a cross section 21 of the rotor 6. FIG. 3 shows the relationship between the electrical angle and the torque ripple $\Delta T$ on another cross section 22 phase-shifted from the cross section 21. Even if the torque ripple is present but if the two cross sections 21 and 22 of the torque ripples are 180° out of phase, the torque ripple component $\Delta T$ on the cross section 21 is cancelled with the torque ripple component $\Delta T$ on the cross section 22. This idea is applied to shift the phases of the torque ripple components generated on the respective cross sections of the rotor. Therefore, a cross section having a torque ripple is assumed to cancel the torque ripple component generated on a given cross section, and the integral value of the torque ripple components along the axial direction of the rotating shaft is set to be zero. For this purpose, the integral interval (i.e., an axial effective length L of the torque generation portion of the rotor) along the axial direction must be equal to or an integer multiple of the period of the torque ripple component $\Delta T$. The above condition is established by the following relation:

(Phase Shift Amount between ends of an axial
effective length of a torque generation portion of
the rotor)=(Electrical Angle of 60° of Stator) or
(Integer Multiple Thereof) (16)

Figures 4A, 4B:
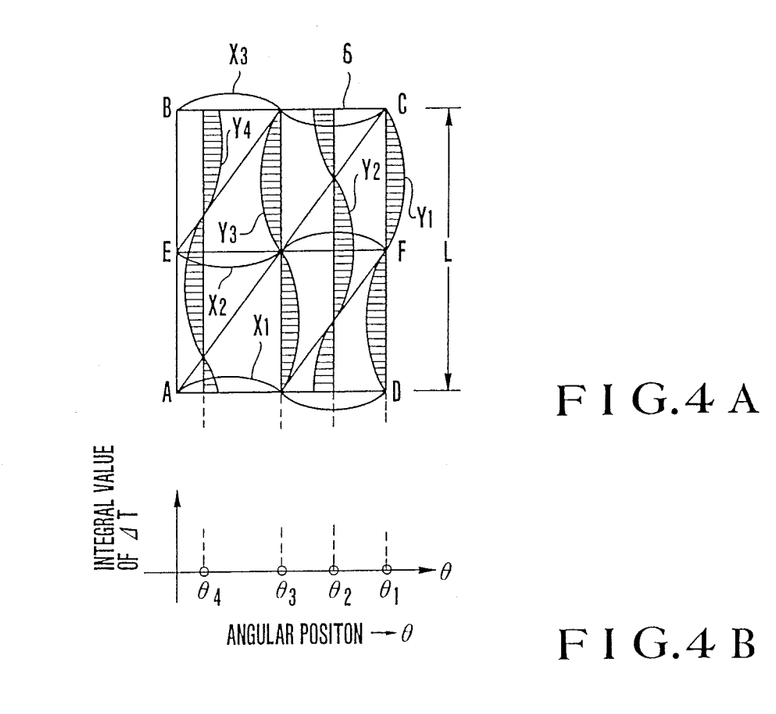
FIG. 4A is a view showing a torque spectrum of an induction motor according to the present invention.
FIG. 4B is a diagram showing an effect of the present invention in correspondence with the torque spectrum shown in FIG. 4A.

FIG. 4A is a developed view wherein the rotor 6 is developed by a stator electrical angle of 60°. The vertical direction of FIG. 4A represents the rotational direction. Reference symbols AD, BC, and EF correspond to cross sections, respectively; and X1, X2, and X3 denote torque ripple curves (corresponding to the 6f1 harmonic components for q=1) on the cross sections, respectively. The torque ripple curves X1, X2, and X3 are represented to be Y1, Y2, Y3 and Y4 along the axial direction of the rotating shaft. The curves Y1, Y2, Y3, and Y4 correspond to angular positions given by rotational angles $\theta 1$, $\theta 2$, $\theta 3$, and $\theta 4$, respectively, as shown in FIG. 4B. When the torque ripple components $\Delta T$ from the cross section A to the cross section B along the axial direction are integrated at any position (rotational angle $\theta$), the integrated value is the one of the one period of the torque ripple components, i.e., zero at all rotational angle $\theta$, as shown in FIG. 4B.

Figure 5A:
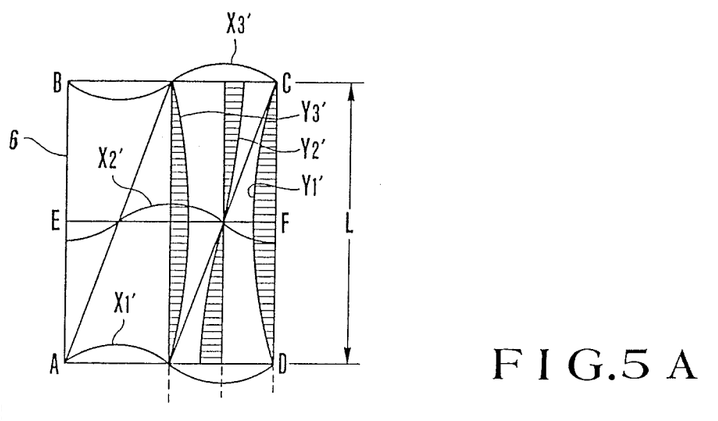
FIG. 5A is a view showing a torque spectrum of an induction motor not associated with the present invention.
Figure 5B:
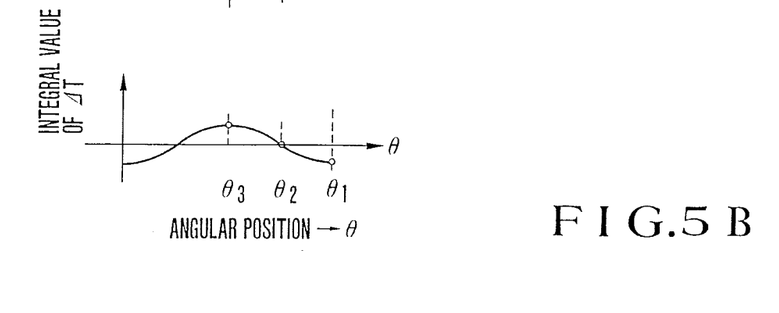
FIG. 5B is a diagram showing a disadvantage of the induction motor whose torque spectrum is shown in FIG. 5A.

FIGS. 5A and 5B show a case wherein the phase shift amount is an electrical angle of 30° not to satisfy condition (16) in correspondence with the case of FIGS. 4A and 4B. Reference symbols X1', X2', and X3' denote torque ripple curves on the cross sections, respectively;

and Y1', Y2', and Y3', torque ripple curves at angular positions corresponding to angles θ1, θ2, and θ3, respectively. In this case, the integrated value of the torque ripple components ΔT is not zero (FIG. 5B) unlike in the case of FIG. 4B.

Condition (16) is a necessary and sufficient condition for cancelling the torque ripple components ΔT of the 6fi harmonic components for q=1.

Cases for q=2, 3, . . . will be described below. If condition (16) is established, the torque ripple curves X1, X2, . . . and Y1, Y2, . . . are present throughout n periods if q=n (n=2, 3, . . .) within the axial length L. The torque ripple integrated value within the axial length L is zero in the same manner as in FIG. 4B. Consequently, condition (16) is proved to be a sufficient condition in the case of q=n (n=2, 3, . . .).

If the phase shift amount is an integer multiple of the electrical angle of 60° in condition (16), the periods of the torque ripple curves X1, X2, . . . and Y1, Y2, . . . are integer multiples for q=1, 2, 3, . . . . An integrated value of the torque ripple components up to the axial length L at any angular position (θ) becomes zero.

As described above, phase shifting of the torques generated on the respective cross sections of the rotor is achieved by a technique so-called skewing in the conventional method. One of the skew methods in conventional induction motors is to incline the stator slots by one slot pitch with respect to the rotor slots. An expected effect is to reduce the influence of the so-called slot harmonic components. The torque ripple by th slot harmonic components is not included in equations (14) and (15).

In a conventional method, an amount by which the stator slots and the rotor slots are to be skewed relative to each other between ends of an axial effective length (L) of a torque generation portion of the motor (referred to as "skew amount" hereinafter) is set to be 360°/n when n is the order of the specific harmonic component of the primary current with respect to the electrical angle of 360°. An expected effect is to eliminate the influence of the nth harmonic component of the primary current. In this case, if n=5, then S5 is zero in equation (13). The component associated with S5 in equation (13) can be improved, but many ripple components by other elements are present according to the experimental results. If the value of 360°/n differs from one pitch of the stator slots, the torque ripple caused by the slot harmonic components often appears distinctly.

Figure 9:
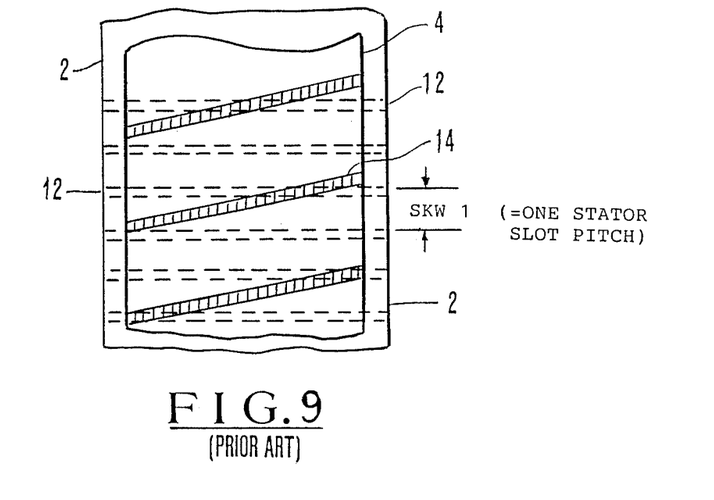
FIG. 9 is a developed view of a rotor showing skew amount of rotor slots in the conventional induction motor.

The skew amount in the induction motor according to the present invention does not depend on the stator slot pitch or the order of the specific harmonic component of the primary current but can be determined by only condition (16). FIG. 9 shows an example of skew amount of the rotor slot 14 in relation to pitch of stator slots in a conventional induction motor. In FIG. 9, a skew amount SKW1 of the rotor slot 14 of the conventional induction motor corresponds to one pitch of the stator slots 12.

Figure 10:
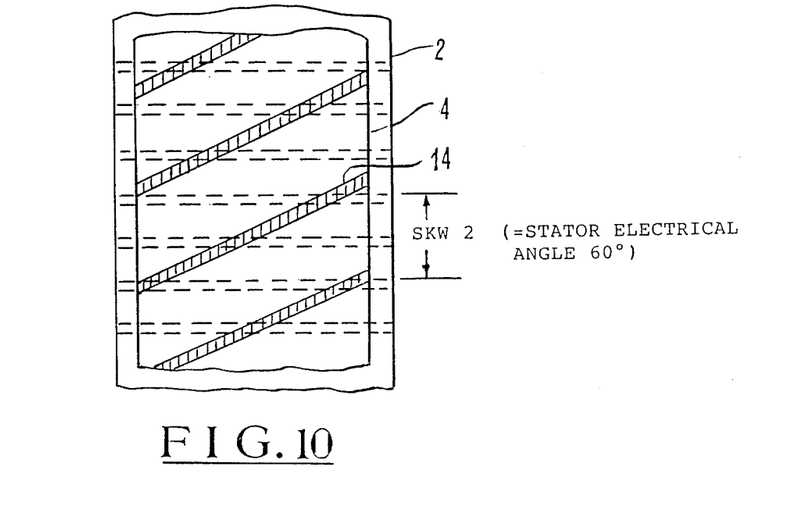
FIG. 10 is a developed view of a rotor showing skew amount of rotor slots in the induction motor according to the present invention.

On the other hand, a skew amount SKW2 of rotor slots 14 of an induction motor according to the present invention does not depend on the pitch of the stator slots 12, but is a stator electrical angle of 60°, as shown in FIG. 10.

Skewing is performed in the present invention, as in the conventional induction motor. Accordingly, as compared with the structure of the conventional induction motor employing conventional skewing, the structure of the induction motor according to the present invention can be simply provided without any difficulty.

(5) Effect of Induction Motor of Present Invention

Figure 6:
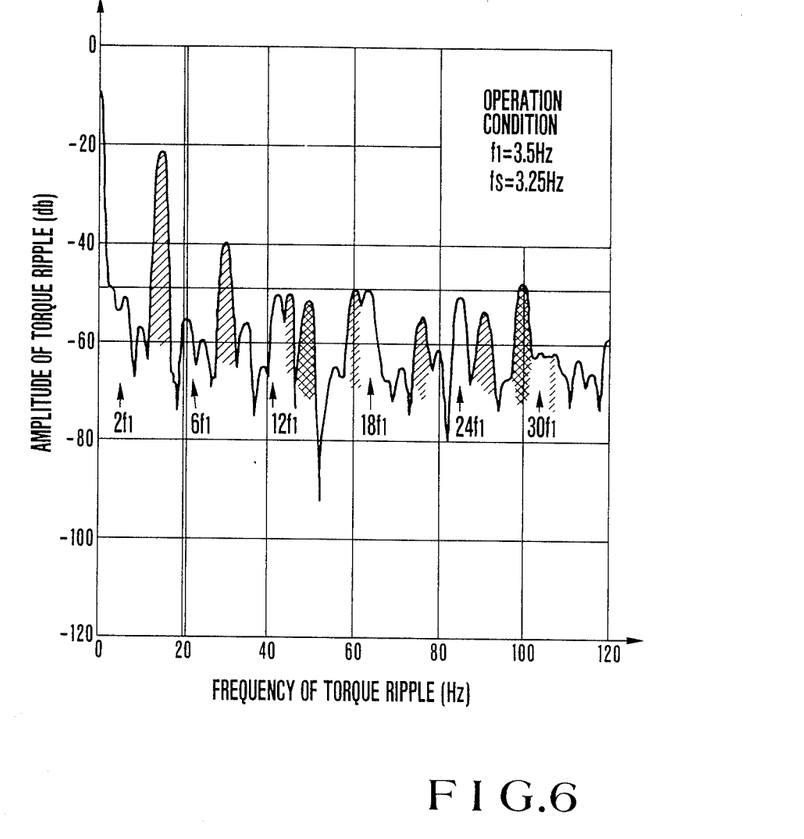
FIG. 6 is a graph showing a torque spectrum of an induction motor according to the present invention.
Figure 7:
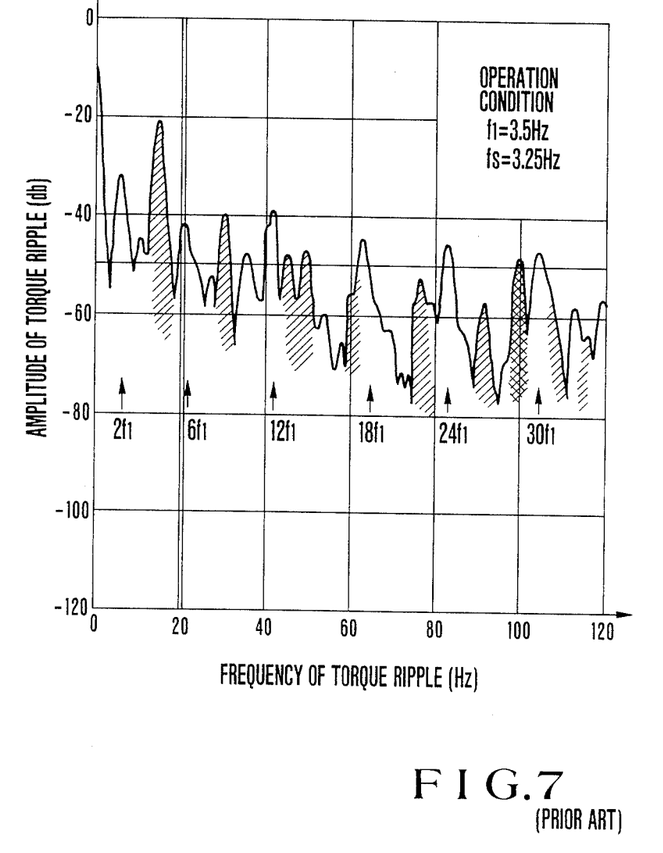
FIG. 7 is a graph showing a torque spectrum of a conventional induction motor.
Figure 8:
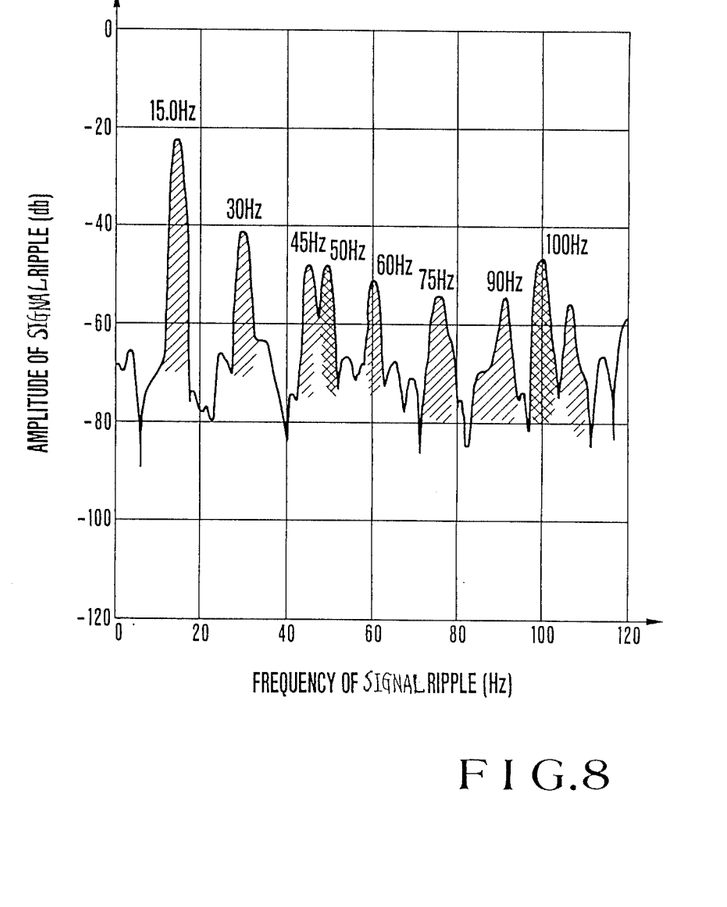
FIG. 8 is a graph showing a signal spectrum of a measuring device used in measurements of spectra shown in FIGS. 6 and 7.

FIG. 6 shows a torque spectrum when the induction motor according to the present invention is operated under conditions that f1=3.5 Hz and fs=3.25 Hz. FIG. 7 shows a torque spectrum of an induction motor when the stator of the induction motor of FIG. 6 is used and the skew amount of the rotor slots is given as one slot pitch as in the conventional case. The conditions of f1 and fs are the same as those in FIG. 6. Referring to FIGS. 6 and 7, the hatched and cross-hatched portions are regarded as the influences (multiples of 15 Hz and 50 Hz) of the spectral detector of FIG. 8. Therefore, the influences must be reduced from the spectra shown in FIGS. 6 and 7. The torque ripple components at the frequencies such as f1×6 and f1×12 in the induction motor of FIG. 6 are smaller than those in the case of FIG. 7 and are much smaller than the case of f1×2. As is apparent from the comparison between FIGS. 6 and 7, great improvements can be made according to the present invention.

(6) Other Applications of Present Invention

The skew amount of the induction motor according to the present invention is determined by condition (16) but does not depend on the number of stator poles, the slot pitch of the stator, and the number of slots in the stator. Therefore, the number of slots of the stator may be an integer number for an electrical angle of 60°, depending on the number of slots of the stator. In this case, the skew amount according to the present invention is applied to remove the torque ripple components caused by the stator slots.

Table I shows technical data of different induction motors. In Table I, p represents the number of poles of the stator, q represents the number of slots per pole and per phase of the stator, and r represents the skew amount figured out as the slot pitch.

In Table I, skew amount (mechanical angle)

$$\text{skew amount (mechanical angle)} = \frac{\text{electrical angle of } 60°}{\frac{p}{2}} \times \frac{r}{q}$$

TABLE I

| No. | P | q | No. of Stator Slots | Skew Amount (Mechanical Angle) Of Present Invention | r |
|---|---|---|---|---|---|
| 1 | 2 | 3 | 18 | 60° (60°/1 × 1) | 3 |
| 2 | 4 | 3 | 36 | 30° (60°/2 × 1) | 3 |
| 3 | 6 | 3 | 54 | 20° (60°/3 × 1) | 3 |
| 4 | 8 | 1 | 24 | 15° (60°/4 × 1) | 1 |
| 5 | 10 | 1 | 30 | 12° (60°/5 × 1) | 1 |
| 6 | 12 | 1 | 36 | 10° (60°/6 × 1) | 1 |
| 7 | 14 | 1 | 42 | 8.57° (60°/7 × 1) | 1 |
| 8 | 16 | 1 | 48 | 7.5° (60°/8 × 1) | 1 |
| 9 | 18 | 1 | 54 | 6.67° (60°/9 × 1) | 1 |
| 10 | 20 | 1 | 60 | 12° (60°/10 × 2) | 2 |
| 11 | 22 | 1 | 66 | 10.9° (60°/11 × 2) | 2 |
| 12 | 24 | 1 | 72 | 5° (60°/12 × 1) | 1 |
| 13 | 26 | 1 | 78 | 9.23° (60°/13 × 2) | 2 |
| 14 | 28 | 1 | 84 | 12.86° (60°/14 × 3) | 3 |
| 15 | 30 | 1 | 90 | 8° (60°/15 × 2) | 2 | p: Number of stator poles
q: Number of stator slots per pole and per phase
r: Skew amount figured out as the slot pitch A stator winding for satisfying the above slot requirements is a so-called concentrated winding. The skew amount is determined to be an integer multiple of stator slot pitch to minimize the torque ripple component which is an integer multiple of six times the primary frequency f1 as well as the torque ripple component caused by the slots.

If the number of poles is large, the skew amount (i.e., an electrical angle) of the induction motor of the present invention is reduced in inverse proportion to the number of poles. Therefore, the skew amount of the induction motor of the present invention can be 120° or 180° in place of the electrical angle of 60° within the limit of condition (16).

If the skew amounts of induction motors according to other embodiments of the present invention satisfy condition (16), one of the stator and rotor slots may be parallel to the rotation axis, and the other one may be inclined with respect thereto since skewing indicates inclination of the rotor slots with respect to the stator slots.

If the structure of the induction motor is assumed such that the rotor has an infinite radius instead of a definite rotational radius and that an arc corresponding to the infinite radius is extracted, a known induction linear motor is proposed. In this case, The secondary structure comprises a moving element in place of rotor, and a thrust instead of torque is generated by the moving element. Therefore, the present invention may be applied to the linear induction motor.

As described above, according to the present invention, there is provided an induction motor which minimizes the torque ripple and which can be suitably applied as a highly precise servo motor driven in a wide variable speed range.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. An induction motor comprising:

a stator having slots for accommodating a primary winding therein, said stator being adapted to generate a rotary magnetic flux upon application of electrical energy to said primary winding; and a rotor, having slots for accommodating a secondary winding comprising one of the groups consisting of coils and a squirrel-cage circuit to generate a torque by an interaction between the rotary magnetic flux crossing said secondary winding and a secondary current flowing in said secondary winding due to electromagnetic induction by said stator when the electrical energy is applied to said induction motor;

said stator slots and said rotor slots being skewed relative to each other by an amount of an integer multiple of a stator electrical angle of 60° between ends of an axial effective length of a torque generation portion of said rotor, thereby minimizing a torque ripple which is an integer multiple of six times of the primary frequency of the electrical energy.

2. A motor according to claim 1, wherein said stator slots are parallel to an axial direction of a rotating shaft, and said rotor slots are skewed relative to said stator slots along the axial direction.

3. A motor according to claim 1, wherein said rotor slots are parallel to an axial direction of a rotating shaft, and said stator slots are skewed relative to said rotor slots along the axial direction.

4. A motor according to claims 1, 2, or 3, wherein the amount of skew is equal to an integer multiple of a stator slot pitch, whereby both a torque ripple caused by the slots as well as the torque ripple which is an integer multiple of six times of the primary frequency are minimized.

5. A motor according to claim 2, wherein said rotor slots are skewed relative to said stator slots by an amount of an integer multiple of a stator slot pitch.

6. A motor according to claim 3, wherein said stator slots are skewed relative to said rotor slots by an amount of an integer multiple of a stator slot pitch.

* * * * *